July 7, 1942.   W. C. HUEBNER   2,289,121
UNIVERSAL SERVICE CAMERA
Filed Feb. 11, 1941   2 Sheets-Sheet 2
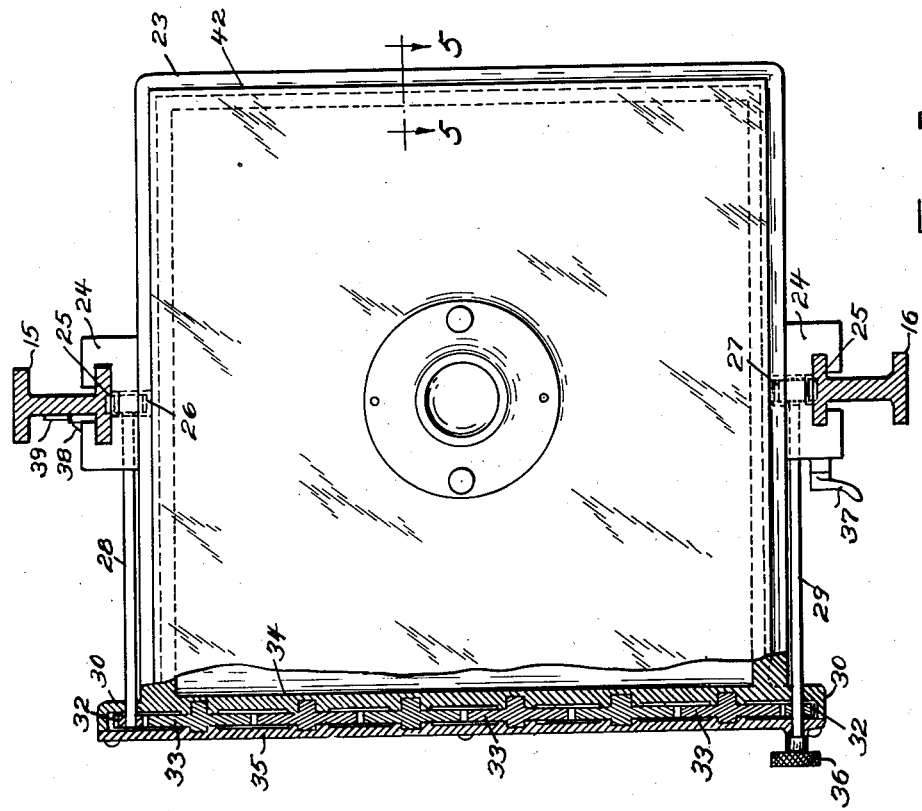
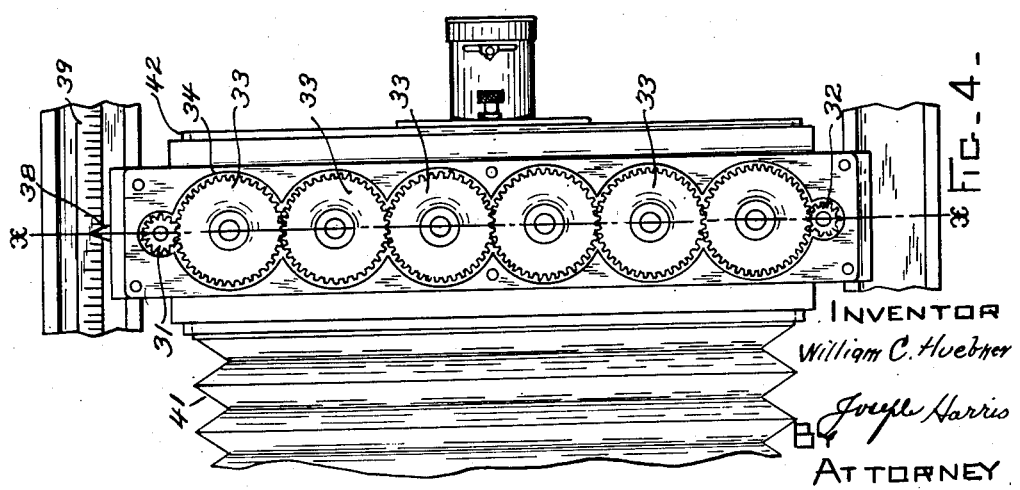
INVENTOR
William C. Huebner
Joseph Harris
ATTORNEY Patented July 7, 1942

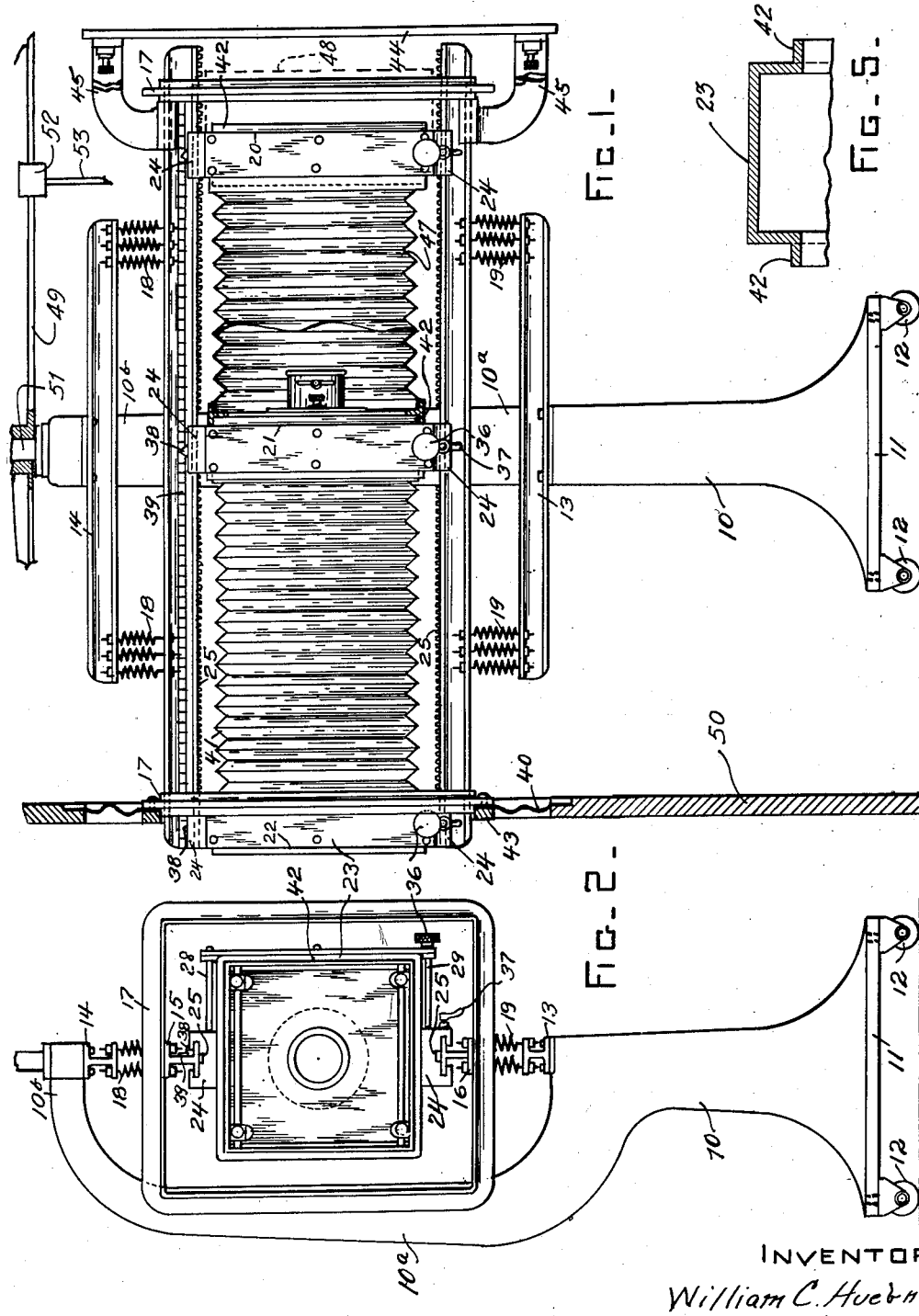

2,289,121

UNITED STATES PATENT OFFICE 2,289,121

UNIVERSAL SERVICE CAMERA

William C. Huebner, New York, N. Y.

Application February 11, 1941, Serial No. 378,340

8 Claims. (Cl. 88—24)

This invention relates to improvements in universal service camera.

One object of the invention is to provide a practical, efficient and comparatively inexpensive camera which will meet all industrial and commercial requirements for fine quality copy preparation of illustration and text.

Another object of the invention is to provide a camera of the type indicated which comprises a single standard or pedestal which supports the entire camera chassis and all associated parts, including various auxiliary attachments, and in such manner as to insure complete elimination of vibration, torque, weave, and pendulum action such as found in prior types of cameras.

Further objects of the invention are: to provide a camera of the type indicated which will occupy the minimum amount of floor space consistent with the maximum plate and film size for which the camera is designed, to provide a camera which is readily movable in its entirety so that the camera may be utilized as a dark room camera or daylight camera according to varying requirements; and, more specifically, by providing a novel spring mounting for the camera chassis so as to prevent deflection of any kind.

Other objects of the invention will more clearly appear from the description and claims hereinafter following.

In the drawings forming a part of this specification, Fig. 1 is a front or side elevation of a camera embodying the invention. Fig. 2 is an end elevation of the camera shown in Fig. 1. Fig. 3 is a part elevational view, part vertical transverse sectional view corresponding to the section line x—x of Fig. 4. Fig. 4 is a broken, side elevational view of a portion of the lens carriage with a cover plate removed in order to illustrate certain details of construction. And Fig. 5 is a horizontal detail sectional view of one of the carriages corresponding to the line 5—5 of Fig. 3. Figs. 3, 4 and 5 are shown on enlarged scales.

In said drawings, 10 indicates a standard or pedestal having a flared base 11 supported by swivelly mounted rollers 12—12. The lower portion of the pedestal 10, as shown, extends vertically and the upper portion thereof indicated at 10ª is laterally offset with the top or end 10ᵇ brought back into general alignment with the lower vertical portion of the pedestal, as best shown in Fig. 2. Rigidly secured to the upper end of the lower vertical section of the pedestal 10 is a horizontal arm 13 of preferably I cross section. A similar arm 14 is rigidly secured to the under side of the top pedestal extension 10ᵇ, said arms 13 and 14 being aligned as clearly shown in Figs. 1 and 2.

The chassis of the camera, as shown, preferably comprises upper and lower, horizontally extending rails 15 and 16 also preferably of I cross section, as shown. To maintain the rails 15 and 16 in constant alignment and to rigidify the chassis, rectangular tie frames 17—17 are employed, one at each set of ends of the rails 15 and 16 and rigidly secured to the latter, the rails 15 and 16 being disposed within the tie frames 17 as best shown in Fig. 2.

The chassis 15, 16, 17 is supported from the pedestal as follows: Secured to each end of the upper arm 14 is a cluster of preferably coiled springs 18—18, the springs being secured at their lower ends to the upper rail 15, as shown, thereby providing a spring suspension for the chassis as will be evident. Between the lower arm 13 and lower rail 16 are interposed two additional sets or clusters of preferably coiled springs 19—19, the tension of which can be adjusted by nuts at the ends thereof as indicated conventionally. The springs 19 are so constructed and arranged that the same are maintained under initial tension and thereby exert a constant downward pull on the chassis and parts carried thereby. It will thus be seen that the springs 19—19 serve to hold the chassis central; prevent side sway or pendulum action; and quickly neutralize any accidental displacement of the chassis caused by bumping or the like.

Horizontally slidably mounted on the rails 15 and 16 are the copy, lens and plate carriages referenced 20, 21, and 22 respectively. Each of said carriages is of substantially like construction, the details of which may best be seen in Figs. 3, 4, and 5. Each said carriage preferably consists of a rectangular frame 23 to which are secured top and bottom guide blocks 24—24 which are suitably slotted so as to engage and slide along the corresponding adjacent flanges of the rails 15 and 16 and by reason of which the respective carriages obviously will be guided and maintained accurately in longitudinal alignment with each other and prevented from transverse shift.

To provide for adjustment of the carriages longitudinally of the chassis and also to insure that each carriage is maintained in absolutely vertical position in any adjusted position, the following arrangement is preferably employed. Secured to or formed on the opposed faces of the rails 15 and 16 and extending longitudinally of the latter are racks 25—25. Cooperable with said racks are upper and lower pinions 26 and 27 respectively, said pinions being carried by upper and lower transversely extending shafts 28 and 29 respectively. Said shafts are suitably journalled in the guide blocks 24 and flanges 30—30 at one side of the frame, as clearly shown in Fig. 3. The shafts 28 and 29, at their outer ends, are provided with pinions 31, 32 respectively and interposed between said pinions is a train of spur gears 33—33, the latter being suitably journalled in the vertical side wall 34 of the carriage frame and a detachable cover bearing plate 35. One of the shafts, preferably the lower shaft 29, has an extension to which is secured a preferably knurled hand wheel 36 by which the shaft may be rotated, as will be evident. With the rack, shafts and gearing just described, it is evident that each carriage may be readily adjusted lengthwise of the chassis and at the same time equal movement of both the upper and lower edges of the carriage positively insured by the gearing interposed between the two fixed racks and thereby preventing any misalignments between any of the carriages.

To hold the carriages in adjusted position, any suitable means may be employed such as a cam lock as indicated conventionally at 37. To assist in obtaining proper focus, each of the carriages may be provided with a pointer or indicator 38 cooperable with a scale 39 provided on the upper rail 15, as best shown in Fig. 1.

In Fig. 1, the camera is shown in position adjacent a wall for dark room use. When so used, the tie frame 17 adjacent the copy holding carriage, is preferably provided with a plate 43 secured to the flange of the tie frame and between which plate and flange is secured flexible opaque preferably rubber sheeting 40 so that a light seal may be formed in the opening of the wall 50.

The camera, as will be understood, will be provided with a bellows 41 between the lens carriage 21 and plate carriage 22, as shown in Fig. 1. When color transparencies are to be reproduced, an additional bellows 47 will be employed, the same being attached at its ends to the lens carriage 21 and copy carriage 20, as shown in Fig. 1. When color transparencies are being reproduced, a lamp housing, such as indicated conventionally by dotted lines at 48 in Fig. 1 will be mounted on the outer side of the copy carriage 20 as also shown in Fig. 1.

One of the important advantages of the present construction adapting the camera for universal service, is the provision of means on the several carriages for interchangeably holding various parts and auxiliary devices, such, for instance, as plate holders, lens board, copy holder frames, bellows sections, screen holders, and illuminating devices. To provide for this ready interchangeability and removability of parts, each of the carriages, as shown in the detailed view Fig. 5, is provided on each side thereof with a raised rib or shoulder 42 which extends around all sides of the frame and over which or to which the several parts and auxiliary devices above mentioned, may be interchangeably secured as will be apparent from Fig. 5, the broken away sectional showing of the bellows 47 telescoped over the shoulder 42 in Fig. 1 and in Fig. 3. By providing for the ready attachment and interchangeability of parts and auxiliary devices, as above indicated, the camera is available for different purposes such as color separation, continuous tone or line work, for photographic type, display or textual matter and all other photographic purposes.

Under certain circumstances, it is desirable to employ a copy board which is larger than will be accommodated on the regular copy carriage 20. To this end the camera is provided with brackets at 45 which are horizontally slidably mounted on the rails 15 and 16 as shown in Fig. 1 and to which brackets is secured the enlarged copy board 44. Portions of the brackets 45 are broken away in order to better accommodate the figure on the sheet. Another feature of the improved camera is the provision of simple means for lighting or illuminating the copy. For this purpose, the pedestal 10 is preferably provided with a pin or stud 51 at the top thereon on which is rotatably mounted a light supporting arm 49, the latter in turn having horizontally slidably adjustably mounted thereon a block 52 with a depending rod 53 on which the light proper may be vertically adjustably mounted. As will be apparent, the light supporting arrangement may be adjusted angularly to any desired position so as to obtain the desired lighting effects on the copy.

As will be apparent from the preceding description, all attachments as well as the carriages of the camera, will be maintained free from vibration, torque, or other distortions. Movement of the camera from one place to another is obviously facilitated by the roller supports for the pedestal and, due to the configuration of the pedestal and position of the chassis, mounting of the light support and enlarged copy holder, a minimum of space is occupied by the entire set-up.

Although there has herein been shown and described what is now considered the preferred manner of carrying out the invention, the same is merely illustrative and not by way of limitation. All changes and modifications are contemplated that come within the scope of the claims appended hereto.

What is claimed is:

1. Camera of the character described comprising, in combination: an upright support; a camera chassis having upper and lower horizontally extending parallel rails and means rigidly uniting said rails; vertically disposed copy, lens, and plate carriages horizontally slidable between and on said upper and lower rails of the chassis; means for independently adjusting each of said carriages lengthwise of said rails and maintaining their respective vertical positions, said means comprising racks on the opposed faces of the upper and lower chassis rails, pinions on each carriage cooperable with said racks, and a train of spur gears on each carriage between each corresponding set of pinions; and spring means interposed between the upright support and the chassis for yieldingly suspending the latter.

2. A camera of the character described comprising, in combination: an upright support; a camera chassis having upper and lower, horizontally extending rails and means rigidly uniting said rails; copy, lens, and plate carriages independently horizontally slidably mounted on said chassis; resilient suspension means interposed between the top of the support and the upper chassis rail; and resilient means interposed between the lower chassis rail and the support.

3. A camera of the character described comprising, in combination: an upright single support; upper and lower horizontally extending, parallel arms rigidly secured to the support; a camera chassis having upper and lower horizontally extending parallel rails; means rigidly uniting and maintaining said rails in spaced parallel position; copy, lens, and plate carriages independently horizontally slidably mounted on said rails; spring tension suspension means interposed between said upper arm and upper rail adjacent the ends of said upper arm; and springs interposed between said lower arm and lower rail adjacent the ends of said lower arm.

4. A camera of the character described comprising, in combination: a single upright support; upper and lower horizontally extending, parallel arms rigidly secured to said support:; a camera chassis having upper and lower horizontally extending parallel rails; a rectangular frame at each end of said rails and rigidly secured to the latter; copy, lens, and plate carriages independently horizontally slidably mounted on said rails; coil springs at each end of said upper arm secured to the latter and to the upper rail of the chassis for suspending the latter; and coil springs at each end of said lower arm secured to the latter and to the lower rail of the chassis.

5. A camera of the character described comprising, in combination: an upright support; upper and lower horizontally disposed parallel arms rigid with said support; a chassis having upper and lower horizontally disposed parallel rails and means rigidly uniting said rails; vertically disposed, copy, lens, and plate carriages horizontally slidable between and on said upper and lower chassis rails; means for independently adjusting each of said carriages lengthwise of said rails and comprising racks on said rails, pinions on each carriage cooperable with said racks and a train of gears on each carriage cooperably interposed between the corresponding sets of pinions; spring suspension means interposed between said upper arm and upper rail; and spring means interposed between said lower arm and lower rail.

6. A camera of the character described comprising, in combination: a portable vertically extending single support having upper and lower spaced, horizontally disposed parallel arms rigidly secured thereto; a chassis comprising upper and lower parallel spaced rails; means adjacent the ends of said rails rigidly securing the same in fixed relative position; racks extending longitudinally of the rails on the opposed faces thereof; spring means adjacent each end of and secured to the upper arm and to the upper rail of the chassis for suspending the latter; spring means adjacent each end of the lower arm and secured to the latter and the lower rail of the chassis; copy, lens, and plate carriages mounted on said chassis, each of said carriages being provided with upper and lower guide blocks slidably engaging the corresponding upper and lower rails of the chassis; and means on the lens carriage for adjusting the latter lengthwise of the chassis, said means comprising upper and lower pinions cooperable with the racks of the corresponding racks of the upper and lower rails, and gearing interposed between said pinions for effecting simultaneous and equal operation of said pinions upon actuation of either.

7. A camera of the character described comprising, in combination: a support; a camera chassis mounted on said support; copy, lens, and plate carriages, each slidably mounted on said chassis, each carriage being provided with formations duplicated, both as to size and contour, on those opposite faces thereof which extend transverse to the camera axis, said formations of all of the carriages being also alike both as to size and contour; and a plurality of camera parts cooperable with and each attachable to a carriage, all of said parts being provided each with a formation complemental and attachable to said carriage formations whereby any said camera part may be interchangeably and similarly attached to either of the opposite faces of any one of said carriages.

8. A camera of the character described comprising, in combination: an upright support; a camera chassis having upper and lower, horizontally extending rails and means rigidly uniting said rails; resilient means interposed between said chassis and support; copy, lens, and plate carriages independently horizontally slidably mounted on said chassis, said carriages being disposed between said rails; and supplemental copy-holding means slidably mounted on said rails, said means including arms extendable beyond the ends of said rails and a copy-holder proper supported by said arms beyond the ends of said rails.

WILLIAM C. HUEBNER.